US009622506B2

(12) United States Patent
Stone et al.

(10) Patent No.: US 9,622,506 B2
(45) Date of Patent: Apr. 18, 2017

(54) ENCAPSULATED SOFT FOOD COMPOSITIONS AND METHODS OF MAKING

(71) Applicant: WikiFoods, Inc., Cambridge, MA (US)

(72) Inventors: Daniel William Stone, Winthrop, MA (US); Kristen Enright, Somerville, MA (US); John Lamppa, Hopkinton, MA (US); Martin Earl Kolewe, Chestnut Hill, MA (US)

(73) Assignee: Incredible Foods, Inc., Boston, MA (US)

( * ) Notice: Subject to any disclaimer, the term of this patent is extended or adjusted under 35 U.S.C. 154(b) by 5 days.

(21) Appl. No.: 14/636,797

(22) Filed: Mar. 3, 2015

(65) Prior Publication Data

US 2015/0230513 A1 Aug. 20, 2015

Related U.S. Application Data

(63) Continuation of application No. PCT/US2015/016598, filed on Feb. 19, 2015.

(60) Provisional application No. 61/941,818, filed on Feb. 19, 2014.

(51) Int. Cl.
| | |
|---|---|
| *A23P 10/30* | (2016.01) |
| *A23P 1/04* | (2006.01) |
| *A23L 19/00* | (2016.01) |
| *A23L 29/238* | (2016.01) |

(52) U.S. Cl.
CPC .............. *A23P 1/04* (2013.01); *A23L 19/09* (2016.08); *A23P 10/30* (2016.08); *A23L 29/238* (2016.08)

(58) Field of Classification Search
CPC .. A23P 10/30; A23P 1/04; A23L 19/09; A23L 29/238
See application file for complete search history.

(56) References Cited

U.S. PATENT DOCUMENTS

| | | | |
|---|---|---|---|
| 3,752,678 | A | 8/1973 | Jenkinson et al. |
| 3,922,360 | A | 11/1975 | Sneath |
| 4,507,327 | A | 3/1985 | Ueda |
| 4,702,921 | A | 10/1987 | Ueda |
| 4,985,263 | A | 1/1991 | Klug et al. |
| 5,783,241 | A | 7/1998 | Bocabeille et al. |
| 6,099,876 | A * | 8/2000 | Nussinovitch ............... 426/98 |
| 6,627,236 | B1 | 9/2003 | Barbeau et al. |
| 2003/0138520 | A1 | 7/2003 | Bell et al. |
| 2004/0161422 | A1 | 8/2004 | Ranganathan |
| 2005/0112235 | A1 | 5/2005 | Shefer et al. |
| 2007/0082094 | A1 | 4/2007 | McClements et al. |
| 2007/0160722 | A1 | 7/2007 | Best et al. |
| 2008/0247684 | A1 | 10/2008 | Binks et al. |
| 2013/0115334 | A1 | 5/2013 | Penhasi |
| 2013/0209614 | A1 | 8/2013 | Doare-Broux et al. |
| 2014/0170203 | A1 | 6/2014 | Edwards et al. |
| 2015/0030775 | A1 | 1/2015 | Edwards et al. |

FOREIGN PATENT DOCUMENTS

| | | | |
|---|---|---|---|
| CA | 2703807 | 11/2011 | |
| EP | 2567624 | 3/2013 | |
| FR | 2785265 | 5/2000 | |
| GB | 1277805 | 6/1972 | |
| GB | 1302275 | 1/1973 | |
| GB | 1564452 | 4/1980 | |
| JP | S53-133648 | 11/1978 | |
| JP | S58-71877 | 4/1983 | |
| JP | S58205463 | 11/1983 | |
| JP | 63192352 | 8/1988 | |
| JP | H01-313421 | 12/1989 | |
| JP | H03-187347 | 8/1991 | |
| JP | H04-222562 | 8/1992 | |
| JP | EP 1074183 A2 * | 2/2001 | ........... A23L 1/0526 |
| JP | 2002-528103 | 9/2002 | |
| WO | 96/28050 | 9/1996 | |
| WO | WO0151196 | 7/2001 | |
| WO | WO02/056713 | 7/2002 | |
| WO | WO2004098318 | 11/2004 | |
| WO | WO2007/038621 | 4/2007 | |
| WO | WO2008037576 | 4/2008 | |
| WO | 2009106218 | 9/2009 | |
| WO | WO2011056904 | 5/2011 | |
| WO | WO2011103594 | 8/2011 | |
| WO | WO2013/113027 | 8/2013 | |
| WO | PCT/US2015/016598 | 2/2015 | |

OTHER PUBLICATIONS

McGlynn. "The Importance of Food pH in Commercial Canning Operations." FAPC-118. Food Technology Fact Sheet, Oklahoma State University, pp. 1-8.*
McGlynn. "The Importance of Food pH in Commercial Canning Operations". FAPC-118 (no date). Food Technology Fact Sheet, Oklahoma State University, pp. 1-8.*
Biopia Archived Product FAQ Web Page from Mar. 27, 2008. Retrieved from https://web.archive.org/web/20080327234235/http:www.2wplastic.com/faq.htm.
Semba et al., Journal of Applied Polymer Science, 101(3) (2006).
Jeon et al., "Photocrosslinked Alginate Hydrogels with Tunable Biodegradation Rates and Mechanical Properties," Biomaterials, 30(14):2724-2734 (2009).
Vargas et al., "Recent Advances in Edible Coatings for Fresh and Minimally Processed Fruits," Crit. Rev. Food Sci. Nutrition, 48:496-511 (2008).

(Continued)

*Primary Examiner* — Jenna A Watts
(74) *Attorney, Agent, or Firm* — McDermott Will & Emery LLP

(57) ABSTRACT

A food composition and method of making is provided, the food composition comprising a soft food and at least one thickening agent, a polymerized edible matrix encapsulating the soft food and at least one thickening agent, wherein an outer surface of the soft food and at least one thickening agent substantially adheres to an inner surface of the polymerized edible matrix encapsulating the soft food and at least one thickening agent.

14 Claims, No Drawings

(56) References Cited

OTHER PUBLICATIONS

Rojas-Grau et al., "Apple Puree-Alginate Edible Coating as Carrier of Antimicrobial Agents to Prolong Shelf-Life of Fresh-Cut Apples," Postharvest Biology and Technology, 45:254-264 (2007).

Oussalah et al., "Antimicrobial Effects of Alginate-Based Film Containing Essential Oils for the Preservation of Whole Beef Muscle," J. Food Protection, 69(10):2364-2369 (2006).

YouTube Video Uploaded on Nov. 4, 2007, Downloaded from htttps://www.youtube.come/watch?v=ML7KWw5n6cY on Aug. 12, 2014.

YouTube Video Uploaded on Mar. 29, 2010, Downloaded from htttps://www.youtube.com/watch?NR=1&feature=endscreen &v=iHu4idQA7Rw on Aug. 12, 2014.

YouTube Video Uploaded on Jan. 4, 2010, Downloaded from htttps://www.youtube.com/watch?v=6UaMR5MdskE on Aug. 12, 2014.

YouTube Video Uploaded on Feb. 5, 2008 Downloaded from htttps://www.youtube.com/watch?v=gKWgmx0Kc1A on Aug. 12, 2014.

YouTube Video Uploaded on Sep. 7, 2011, Downloaded from htttps://www.youtube.com/watch?v=DQvYfMq0Qrs on Aug. 12, 2014.

Farris et al., Development of Polyion-Complex Hydrogels as an Alternative Approach for the Production of Bio-based Polymers for Food Packaging Applications: A Review, Trends in Food Science & Technology, 20:316-332 (2009).

Russo et al., "Beta-Glucose Improve Growth, Viability and Colonization of Probiotic Microorganisms," International Journal of Molecular Science, 13:6026-6039 (2012).

Cram et al., "Challenges of Developing Palatable Oral Paediatric Formulations," International Journal of Pharmaceutics, 365:1-3 (2009).

Draget et al., "Alginates for Algae," Polysaccharides and Polyamides in the Food Industry, Properties, Production and Patents, pp. 1-30 (2005).

Mannion et al., "Xanthan/locust Bean Gum Interactions at Room Temperature," Carbohydrate Polymers, 19:91-97 (1992).

Rogers et al., "Reviewing the Use of Ethylcellulose, Methylcellulose and Hypromellose in Microencapsulation. Part 2: Techniques Used to Make Microcapsules," Drug Development and Industrial Pharmacy, 37:1259-1271 (2011).

Salles et al., "In-Mouth Mechanisms Leading to Flavor Release and Perception," Critical Reviews in Food Science and Nutrition, 51:67-90 (2011).

Yang et al., "Encapsulating Aspirin into a Surfactant-Free Ethyl Cellulose Microsphere Using Non-Toxic Solvents by Emulsion Solvent-Evaporation Technique," J. Mircoencapsulation, 18:223-236 (2001).

International Search Report dated May 15, 2015 from corresponding PCT Application No. PCT/US2015/016598.

* cited by examiner

ENCAPSULATED SOFT FOOD COMPOSITIONS AND METHODS OF MAKING

RELATED APPLICATIONS

This application is a continuation of PCT Application No. PCT/US15/16598, filed on Feb. 19, 2015, which claims the benefit of U.S. Provisional Application No. 61/941,818, filed on Feb. 19, 2014 and is incorporated by reference in its entirety herein.

TECHNICAL FIELD

This disclosure relates to edible materials and encapsulating food compositions.

BACKGROUND

Food compositions can be a source of nutrition and gustatory enjoyment for consumers of all ages. Additionally, food compositions can provide an efficient vehicle for delivering portion controlled servings and portions that are minimally messy, potentially have little or no packaging, and are easy to handle and consume. Many foods can be difficult for certain people to consume because of the solid structure. i.e., hard or solid foods can be difficult for babies, toddlers or persons with certain dental conditions to chew and swallow. Therefore, directed consumer groups continually seek food compositions that are safe to chew and swallow, and are easy to handle and consume.

SUMMARY

This disclosure relates to soft foods encapsulated in an edible membrane matrix. The soft food products provide certain advantages in consumption compared to solid or hard food products. The soft food products are easily managed food alternatives for toddlers and babies who are otherwise incapable of eating hard foods, and provide alternative food sources for adults with certain medical or dental conditions.

Provided herein is a soft food composition, and methods of making the same, in the form of an encapsulated food product comprising a soft food and at least one thickening agent, and a polymerized edible matrix encapsulating the soft food and at least one thickening agent, wherein an outer surface of the soft food and at least one thickening agent substantially adheres to an inner surface of the polymerized edible matrix encapsulating the soft food and at least one thickening agent.

The thickening agent can be 1,3-butylene glycol, acacia, acetic and fatty acid esters of glycerol, acetone, acetone peroxides, acetylated distarch adipate, acetylated distarch phosphate, acetylated monoglycerides, acid-treated starch, adipic acid, agar, alginic acid, alkaline-treated starch, aluminum ammonium sulfate, aluminum potassium sulfate, aluminum silicate, aluminum sodium sulfate, aluminum sulfate, aluminum ammonium sulfate, ammonium adipate, ammonium alginate, ammonium bicarbonate, ammonium carbonate, ammonium chloride, ammonium dihydrogen phosphate, ammonium hydrogen carbonate, ammonium phosphate, ammonium phosphatides, ammonium salts of phosphatidic acid, ammonium sulfate, anoxomer, ascorbic acid, ascorbyl palmitate, ascorbyl stearate, azodicarbonamide, beeswax, benzoic acid, benzoyl peroxide, beta-cyclo-dextrin, bleached starch, bone phosphate, brominated vegetable oil, butyl p-hydroxybenzoate, butylated hydroxyanisole, butylated hydroxymethylphenol, butylated hydroxytoluene, calcium acetate, calcium alginate, calcium aluminum silicate, calcium ascorbate, calcium benzoate, calcium bromate, calcium carbonates, calcium chloride, calcium citrate, calcium dihydrogen phosphate, calcium disodium ethylenediamine-tetraacetate, calcium DL-malate, calcium ferrocyanide, calcium gluconate, calcium hydrogen sulfite, calcium hydroxide, calcium iodate, calcium lactate, calcium lactobionate, calcium peroxide, calcium phosphate, calcium polyphosphates, calcium propionate, calcium pyrophosphatecalcium salts of fatty acids, calcium silicate, calcium sorbate, calcium stearate, calcium stearoyl lactylate, calcium sulfate, calcium tartrate, calciumiodiate, candelilla wax, carbamide, carbon dioxide, carnauba wax, carob bean gum, carrageenan, castor oil, cellulose gum, celluloses, chlorine, chlorine dioxide, cholic acid, choline salts and esters, citric acid, citric and fatty acid esters of glycerol, crosslinked sodium carboxymethylcellulose, cupric sulfate, D-alpha-tocopherol, dammar gum, decanoic acid, dedesoxycholic acid, dedextrins, dextrin ethyl cellulose, dehydroacetic acid, dextrose, diacetyltartaric acid esters of mono- and diglycerides of fatty acids, diammonium hydrogen phosphate, dicalcium pyrophosphate, diethyl pyrocarbonate, dilauryl thiodipropionate, dimethyl dicaronate, dimethylpolysiloxane, dioctyl sodium sulfosuccinate, dipotassium hydrogen phosphate, disodium ethylenediamine-tetraacetate, disodium hydrogen phosphate, disodium pyrophosphate, distarch phosphate, DL-alpha-tocopherol, DL-tartaric acid, dodecyl gallate, erythorbic acid, ethoxyquin, ethyl alcohol, ethyl cellulose, ethyl hydroxyethyl cellulose, ethyl p-hydroxybenzoate, ethyl protocatechuate, ethylene dichloride, esters of glycerol and thermally oxidized soy bean fatty acids, ethoxylated mono- and diglycerides, ethyl hydroxyethyl cellulose, ferric ammonium citrate, ferrous ammonium citrate, formic acid, gellan gum, gelatin, genipin, gibberellic acid, glucono delta-lactone, glycerin, glycerol, glycerol ester of wood rosin, guaiac resin, guar gum, gum acacia, gum arabic, gum ghatti, gum guaiac, heptylparaben, peroxide derivatives, hydrogen peroxide, hydroxylated lecithin, hydroxypropyl cellulose, hydroxypropyl distarch phosphate, hydroxypropylmethyl cellulose, hydroxypropyl starch, insoluble polyvinylpyrrolidone, iron gluconate, iron lactate, isoamyl gallate, isopropyl alcohol, isopropyl citrate mixture, kaolin, karaya gum, L(+)-tartaric acid, lactated monodiglycerides, lactic and fatty acid esters of glycerol, lactitol, lactylated fatty acid esters of glycerol and propylene glycol, lactylic esters of fatty acids, lauric acid, lecithin, locust bean gum, magnesium carbonate, magnesium DL-lactate, magnesium gluconate, magnesium hydrogen carbonate, magnesium hydroxide, magnesium hydroxide carbonate, magnesium L-lactate, magnesium oxide, magnesium salts of fatty acids, magnesium silicate, magnesium stearate, maltitol, mannitol, methyl alcohol, methyl ethyl cellulose, methylcellulose, methylene chloride, metatartaric acid, methylparaben, microcrystalline cellulose, milk protein, mineral oil, modified cellulose, modified starches, monoglyceride citrate, mono- and diglycerides, monostarch phosphate, myristic acid, nisin, nitrogen, nitrous oxide, nordihydroguaiaretic acid, o-phenylphenol, octanoic acid, octyl gallate, oleic acid, oxidized starch, oxystearin, palmitic acid, paraffin wax, pectin, pentapotassium triphosphate, pentasodium triphosphate, petrolatum, petroleum jelly, petroleum wax, phosphated distarch phosphate, phosphoric acid, pimaricin, poloxamer 331, poloxamer 407, polydimethylsiloxane, polydextroses, polyethylene glycols, polyglycerol esters of fatty acids, polyoxyethylenes, polypropylene glycol, polysorbates, polyvinylpolypyrrolidone, polyvinylpyrrolidone, potassium acetate, potassium acid tartrate, potassium adipate, potassium alginate, potassium benzoate, potassium bicarbonate, potassium carbonate, potassium chloride, potassium citrate, potassium dihydrogen citrate, potassium dihydrogen phosphate, potassium ferrocyanide, potassium gibberellate, potassium gluconate, potassium hydroxide, potassium iodate, potassium lactate, potassium metabisulfite, potassium nitrate, potassium nitrite, potassium persulfate, potassium phosphate, potassium polymetaphosphate, potassium polyphosphates, potassium L(+)-tartrate, potassium salts of fatty acids, potassium sorbate, potassium sulfate, potassium sulfite, potassium tripolyphosphate, processed eucheuma seaweed, propane-1,2-diol alginate, propionic acid, propyl gallate, propyl p-hydoxybenzoate, propylene glycol, propylene glycol alginate, propylene glycol esters of fatty acids, propylene glycol mono- and diesters, propylene oxide, propylparaben, quillaia extracts, rice bran wax, salts of fatty acids, shellac, silicon dioxide, sodium acetate, sodium acid, sodium acid pyrophosphate, sodium adipate, sodium alginate, sodium aluminosilicate, sodium aluminum phosphate, sodium ascorbate, sodium benzoate, sodium bicarbonate, sodium bisulfite, sodium carbonate, sodium carboxymethylcellulose, sodium caseinate, sodium chloride, sodium citrate, sodium dehydroacetate, sodium diacetate, sodium dihydrogen citrate, sodium dihydrogen phosphate, sodium dioxide, sodium DL-malate, sodium erythorbate, sodium ferrocyanide, sodium fumarate, sodium gluconate, sodium hydrogen carbonate, sodium hydrogem DL-malate, sodium hydrogen sulfite, sodium hydroxide, sodium hypophosphite, sodium L(+)-tartrate, sodium lactate, sodium lauryl sulfate, sodium metabisulfite, sodium metaphosphate, sodium nitrate, sodium nitrite, sodium phosphates, sodium polyacrylate, sodium polyphosphates, sodium potassium tartrate, sodium propionate, sodium pyrophosphate, sodium salts of fatty acids, sodium sesquicarbonate, sodium stearoyl lactylate, sodium stearyl fumarate, sodium sulfite, sodium tartrate, sodium thiosulfate, sodium tripolyphosphate, sorbic acid, sorbitan monolaurate, sorbitan monooleate, sorbitan monopalmitate, sorbitan monostearate, sorbitan tristearate, sorbitol, sorbitol sodium, sulfur dioxide, stannous chloride, starches, starch acetate, starch sodium octenylsuccinate, stearic acid, stearyl citrate, stearyl monoglyceridyl citrate, stearyl tartrate, succinic acid, succinylated monoglycerides, sucroglycerides, sucroses, sucrose acetate isobutyrate, sucrose esters of fatty acids, talc, tannic acid, tannins, tara gum, tartaric acid, tert-butylhydroquinone, tetrapotassium pyrophosphate, tetrasodium pyrophosphate, thiodipropionic acid, tocopherols, tragacanth, tragacanth gum, triacetin, triammonium citrate, tricalcium phosphate, trichloroethylene, triethyl citrate, trimagnesium phosphate, tripolyphosphate, tripotassium citrate, tripotassium phosphate, trisodium citrate, trisodium phosphate, urea, waxes, xanthan gum, xylitol, derivatives thereof, and combinations thereof. The thickening agent can be a polysaccharide. The thickening agent can be selected from xanthan gum and a galactomannan. The galactomannan can be at least one of the group consisting of locust bean gum, guar gum, combinations thereof, and/or derivatives thereof. The thickening agent can be at least one of an agar and an alginate.

The soft food can be at least one of a gel, an emulsion, a foam, a semi-solid, and combinations thereof. The pH of the soft food can be above or above a pKa of an un-polymerized edible matrix. The pH of the soft food can be about or above pH 3.3.

The matrix can be at least one polysaccharide selected from the group consisting of a hydrocolloid, shellac, and fibers. The matrix can be at least one of an alginate and a chitosan.

The soft food can be a reconstituted fruit or a fruit puree. The soft fruit or puree can be selected from the group consisting of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof.

The soft food can further comprise a food-like particle.

DETAILED DESCRIPTION

Soft Food Compositions and Encapsulating Membranes

Soft foods provide advantages for edibility to all age groups. Soft foods can be foods reconstituted from processed food forms (for example food extracts or pureed foods including, for example, apple sauce or apple puree), naturally soft foods such as bananas, yogurts and certain soft cheeses, etc., or manufactured foods that are comprised of soft textures (for example, certain ice creams). Soft foods can be easier to ingest as well as provide a viable food form alternative to those who are unable to easily or safely eat solid food products. Additionally, novel soft food flavors can be created with combinations of food sources, as well as be presented to a consumer conveniently sized and portion controlled servings. Soft foods can also be used in combination with nutraceuticals, pharmaceuticals, functional foods, or other food additives and combinations engineered for specific consumer markets and purposes.

Soft foods are generally solid, semi-solid or liquid in form, are capable of providing nutrition when consumed, and are typically provided in a form suitable for ingestion. Soft foods can be derived from many sources including plants and animals, particularly those generated by agriculture, or from artificial production methods including chemical synthesis. Soft foods provide for an organism's (e.g., a human or other mammal) nutritional needs or sensory desires, typically when consumed orally, and are usually non-toxic when properly consumed. Liquid refers to having a consistency like that of a fluid, that is to say, flowing freely but of constant volume. Solid refers to being characterized by structural rigidity and resistance to changes of shape and volume. Semi-solid refers to having a rigidity intermediate between a solid and a liquid. Viscosity refers to a fluid's resistance to flow, wherein gel-like liquids have higher viscosity for example, honey is more viscous than water. Foam refers to a mass of small bubbles formed on or in a substrate, typically a liquid, but also includes ice cream, frozen yogurts and gelato. Frozen refers to a phase state of liquid or fluid in which the liquid or fluid achieves a highly viscous state when surrounding temperature is lowered beyond its freezing point. In some embodiments, the food material may be liquid, partially liquid, viscous, partially or fully solid, or contains several states of matter having different degrees of liquidity or solidness.

Ingestible substances include those that are used as and in soft foods including, for example, juice, chocolate, various medicines, fruits, vegetables, meats, confections, carbohydrates, etc., in various states such as solids, liquids, slurries, emulsions, foams, etc. For example, foods, particularly fruits and vegetables, such as berries, plants, and beans, are provided in various states of matter: liquid, semi-solid, solid, and frozen. They can be mixed with each other and optionally one or more nutrients and additives in varying proportions can be added to the mixture to produce a large variety of novel food objects. Their texture and consistency can be manipulated by physical, chemical or biochemical means.

Encapsulating Membranes

As used herein, the terms "membrane(s)," "matrix" or "matrices," and "shell(s)" may refer to similar or different materials or kinds of materials, depending on the type of object, how many barrier layers of any sort it may have, or the properties and contents of any such barrier layers. Thus, for some embodiments, the terms can be used interchangeably. In certain embodiments, membranes and/or membranes and shells are edible, providing nutritious benefits as well as reducing concerns about littering and waste.

Embodiments of encapsulated soft foods described herein can have, e.g., varying shell or membrane thickness, one or more of a variety of chemical constituents, varying numbers of membranes, various consumable payloads, various shapes, and are constructed from various shell/membrane properties to provide a variety of flavors and textures and membrane characteristics. Embodiments of the encapsulated soft foods can be made at large scale, using, for example, injection techniques, spray and spray drying techniques, fluidized-bed and other technologies. See, for example, PCT International Publication No. WO 2011/103594 and PCT International Application No. PCT/US2013/023500, which are incorporated herein by reference in their entirety.

Membranes and shells of encapsulated soft foods may be made by using any one of many edible and/or biodegradable polymers. Alginate (alginic acid) as an example of a polymer that can be used in forming a membrane of transport systems. Alginate is an anionic, polymeric polysaccharide, widely present in the cell walls of brown algae. It is a copolymer $-(M)_m-(G)_n-$ segments composed of mannuronate M (mannuronic acid) and guluronate G (guluronic acid) monomeric subunits. The values of m and n, the ratio m/n, and the space distribution between M and G (i.e. presence of consecutive G-subunits and M-subunits, or randomly organized subunits) all play key roles in the chemical and physical properties of the final membrane.

Alginates have been applied to pharmaceutical preparations, impression-making materials (e.g., in dentistry and in prosthetics manufacturing), and in the food industry. Sodium alginates also have found application in restaurants, e.g., to create spheres of liquid surrounded by a thin jelly membrane. Beyond their biocompatibility to human use, polymers such as alginate have the capacity to easily form a gel. To induce rapid gelation by electrostatic cross-linking, the naturally present $Na^+$ ions are removed and replaced by divalent cations (e.g., $Ca^{2+}$ or another multi-valent cation such as $Mg^{2+}$).

Our approach involves forming encapsulated soft foods that use various particles, particulates and polymers, in combination or separately, to create desired properties of strength, stability, permeability, edibility and biodegradability for the soft food compositions to be easily handled and consumed. As used herein, the terms particle(s) and particulate(s) are used interchangeably.

In some embodiments, a consumable, edible product is encased in a polysaccharide membrane, for example, an alginate membrane. Methods for encasing a consumable edible product are found in PCT International Publication No. WO 2011/103594 and PCT International Publication No. WO 2013/113027, which are incorporated herein by reference in their entirety.

In some embodiments, ingestible particles embedded in a membrane are shown to improve the physical, chemical and/or physico-chemical performance characteristics of the membrane suitable for particular payloads (i.e. edible or potable substances), including, but not limited to, diffusion characteristics, pore size of the membrane, elasticity, etc. In certain embodiments, the ingestible particles impart a flavor, for example chocolate or various fruit flavors. When particles are charged and possess the same charge state as other membrane polymers or particulates, one can vary membrane component concentrations (for example, decreasing the membrane polymer concentration and increasing the membrane particulate concentration) while maintaining or optimizing membrane performance. In certain embodiments of, for example, an alginate based membrane, when particles carry the opposite charge state as alginate polymers or particulates, one can minimize or eliminate the need for a calcium solution or another multivalent ion by using particles to bind with alginates or another charged polymer. For non-alginate based systems, combinations of homogenous particles can be used to encapsulate the edible material, or can be used in combination with polymers at lower weight %-by-mass than the particles (for example, less than 80%, less than 70%, less than 60%, less than 50%, less than 40%, less than 30%, less than 20%, less than 10% polymer). In certain embodiments, a thinner membrane can be sufficient to encapsulate a larger quantity of ingestible material, which may have further advantages of taste and texture. Particles contemplated herein include large food particles, for example greater than 1 millimeter (linseeds, sesame seeds, poppy seeds, chia seeds, chopped or pulverized foods including fruits, fruit skins, vegetables, etc.), small grains, and pulverized seeds, nuts, etc. In some embodiments, compositions use particulates less than about 1 millimeter.

In certain embodiments, particulates used for the membrane(s) can advantageously affect the membrane strength, diffusion permeability, elasticity, compressibility, diffusion kinetics, pore size and stability. Important variables when considering particulates as components for membranes include: 1) the particle charge or net charge of a heterogeneous or homogeneous particulate mix, 2) the specific combinations of particulates for a heterogeneous mix, 3) the hydroscopic or hydrophilic nature of the particulates, 4) solubility of particulates in a liquid polymer, 5) aqueous solubility of the particles, 6) particle solubility in polar, non-polar or amphipathic solvents, 7) particle size, 8) heterogeneity of particle size, 9) heterogeneity of particle sizes in a heterogeneous or homogenous mix of particles, 10) shape of particulates in a heterogeneous or homogenous mix of particles, and 11) chemical and physical nature of the edible or potable substance to be encased in the membrane when interacting with the particulates.

In some embodiments, the particles are neutrally charged. In some embodiments, the particulates have various charge states, and can have an opposite charge as the membrane polymer or other membrane constituents. The overall charge state of the membrane polymer or other membrane constituents influences the choice of particulates, as particles oppositely charged to the charge state of the membrane polymer or particle matrix are likely incorporated into the membrane matrix and preferentially bonded. Oppositely charged particles could contribute to the formation of salt bridges within the membrane matrix and/or membrane polymeric subunit architecture.

In certain embodiments, polysaccharide polymers are used as the membrane polymer. Polysaccharide polymer based membranes are porous, with porosity determined by the chemical content and 2- and 3-dimensional geometry of the polymeric structure of the membrane, for example the structure of the polysaccharide chain. Therefore, particulates are used that can be appropriately accommodated by the pore structure of the membrane, whether as particles that can be intercalated between polymeric chains and/or embedded into the pores to act as a plug based on a particulate size and shape, electrostatically bind to create salt bridges, enhance Van der Waal's interactions that can contribute to overall membrane stability, etc. As described herein, various physical and chemical characteristics of the particulates are matched to the membrane structure and chemistry to achieve a desired effect, for example increased impermeability, elasticity, membrane strength-to-weight ratio, color, syneresis, etc. In particular embodiments, the membrane can have a strength sufficient to support a volume of water, for example 1 cubic centimeters (cc), 5 cc, 10 cc, 20 cc, 30 cc, 40 cc, 50 cc, 100 cc, 200 cc, 300 cc, 400 cc, 500 cc, 600 cc, 700 cc, 800 cc, 900 cc, 1000 cc, 1200 cc, 1400 cc, 1600 cc, 1800 cc, 2000 cc, 3000 cc, 4000 cc, 5000 cc, 6000 cc, 7000 cc, 8000 cc, 9000 cc, 10000 cc, or more, without rupturing, and when handled or transported. In particular embodiments the membrane is a continuous membrane, fully encapsulating an edible or potable substance such that the edible or potable substance is fully contained and does not leak out from within encapsulation due to mechanical stress, rupture, shearing, etc., of the membrane. In other particular embodiments, the cross-linked matrix has a thickness from about 10 microns to about 200 millimeters.

In some embodiments, the particulates used for the membrane are sized at about 0.01 microns, at about 0.1 microns, at about 0.1 to 1.0 microns, at about 0.1 to 10 microns, at about 0.1 to 100 microns, at about 0.01 to about 1 millimeter or to about 3 millimeters, or at about 0.1 to about 1 millimeter or to about 3 millimeters. The size of the particulates may be important for embedment characteristics into the porous structure of the membrane.

The porosity of membranes is also determined in part by the ratios of the subunits and or the particulates that assemble to form the membrane. For example, alginate based membranes are composed of mannuronic acid and guluronic acid subunits. In general, for alginates, increasing the number of guluronic acid subunits relative to the number of mannuronic acid subunits will contribute to a loss of mobility of the membrane polymers, resulting in a stiffer and more stable membrane. However, the stability is also offset by increased porosity of the membrane. Also contributing to porosity can be the overall concentration of polymer used when in solution. All else being equal, increasing the concentration (and therefore the density) of a polymer can decrease the porosity of the final membrane. However, other considerations such as consumer preference or gustatory experience when ingesting the membrane will likely limit the range of desirable polymer concentrations. Therefore, ratios of polymeric building blocks and/or particulates of a membrane may be considered for determining membrane porosity with respect to particulate embedment, solution diffusion, and membrane permeability, and how these characteristics are related to each other.

In certain embodiments, the molecular weight of the membrane polymer is between about 2000 daltons and about 2,000,000 daltons or larger. In other embodiments, the polysaccharide polymer present in solution is between about 0.1% by weight and about 5% by weight, between about 0.1% and 10%, by weight, or greater.

In certain embodiments, not all of the particulates are incorporated into the membrane. Instead, in some embodiments, a layer of particulates remain unincorporated, and form a layer next to a membrane or between two or more membrane layers. The additional particulate layer therefore contributes to, for example, permeability, elasticity, strength, durability, syneresis, hygroscopy, hydrophobicity, etc., changes across and within membrane layers. Thus, the chemical nature of the particulates, for example if a hydrophobic particulate is used, can contribute to impeding the flow of liquid diffusion across an inner layer to an outer layer surface boundary. In some embodiments, particulates can be layered so that the particulate layer has multiple effects, for example an inner impermeability layer, a middle flavor/texture/payload (e.g. a pharmaceutical or supplement) layer, and an outer strength improving layer.

Particles as described herein can be both in the soft food and in the membrane. The particles in the membrane and in the soft food can be the same particles or different particles, can be uniform size or exhibit a range of sizes, and/or exhibit similar or different physical-chemical characteristics.

In some embodiments, the soft food can be coated and/or embedded in a plurality of membranes. In certain embodiments, the membrane layers are distinct and melded. In other embodiments, the membrane layers are separate and distinct from other membrane layers. In certain embodiments, the same polymer, particulate, or combination of polymer(s) and/or particulate(s) is used for each of the multi-membrane coatings as described herein. In certain embodiments, different polymers, particulates, or combination of polymer(s) and/or particulate(s) are used for each membrane in a multi-membrane layer. In some embodiments, a multilayered outer membrane has the same polymer, particulate, or combination of polymer(s) and/or particulate(s) in each of the outer layers, but the membrane components are different than that used in, for example, the inner membrane or other inner membrane layers.

To accomplish the use of the same membrane components in a multi-membrane layered system while keeping the layers separate and distinct, in some embodiments, the inner membrane is first constructed, with or without additional particulates and/or polymers incorporated into the inner membrane. The membrane coated substance can then be layered with one or more additional polymerparticulate layers of homogenous or heterogeneous polymerparticulates, and then the particulate layer can be coated again with another membrane. The process may be repeated as many times as desired to construct a multilayered product.

Various membrane polymers are contemplated for use in the membrane forming layers. Considerations for choice of membrane polymers include inherent physico-chemical characteristics (charge states, functional groups, kinetic reaction rates of polymerization, ion complex formation and cross-linking, etc.), texture, polymerization characteristics, reactivity to chemical interactions and reactions such as pH, ionic strength, specific ions and ratios of ions during polymerization, presence of complexing agents (e.g., phosphates, citrate, ethylenediaminetetraacetic (EDTA) acid, acids, glucono-delta-lactone (GDL), etc.), shielding susceptibility of electrostatic character of polymer and polymeric strands, and cost effectiveness if used for commercial production. Polysaccharide polymers contemplated herein include, but are not limited to, shellac, various fibers and hydrocolloids such as alginate, an agar, a starch, a gelatin, carrageenan, xanthan gum, gellan gum, galactomannan, gum arabic, a pectin, a milk protein, a cellulosic, gum tragacanth and karaya, xyloglucan, curdlan, a cereal β-glucan, soluble soybean polysaccharide, a bacterial cellulose, a microcrystalline cellulose, chitosan, inulin, an emulsifying polymer, konjac mannankonjac glucomannan, a seed gum, and pullulan. Combinations of these polysaccharides are also contemplated herein.

Other membrane compounds considered for use as structure forming compounds to modify or be used in combination with a polymer-based membrane (for example, a membrane consisting of a polysaccharide) include bagasse, tapioca, chitosan, polylactic acid, processed seaweed, chocolate, starch, gum arabic, cellulose based fibers, natural and synthetic amino acids and polymers thereof, proteins and sugars/sugar derivatives, etc. Combinations of these compounds and compositions are also contemplated herein.

A multi-layered and/or multi-component membrane for transport systems can have several advantages: increased longevity or freshness of the soft food; limited diffusion of aqueous components of membrane polymers or soft foods; decreased water activity of the potable or edible payload; wider spectrum of taste sensation and experience by a consumer when powders of different flavors and mouth feel sensations are used, for example, between layers in a multilayered composition, taste improvement of a pharmaceutical or over the counter drug(s) if used as the particulate, etc. Incorporation of particulates into the outermost membrane can modify membrane performance, for example the prevention of the outer membrane from polymerizing and/or mechanically bonding with the inner or proximate membrane layer. Unincorporated particulates also likely form a physical barrier between membranes so that a chemical or mechanical bonding between membranes does not occur. Electrostatic repulsion/attraction, hydrophobicity and/or hydrophilicity of particulates and other solvent/solute interactions between particulates and membrane polymer components may also contribute to preventing an interaction between a polymerized layer and a non-polymerized membrane component.

In some embodiments of a multilayered membrane, the proximately located membrane layers are made using the same polymer and the same particulates. In some embodiments, the proximately located membrane layers are made using different polymers and the same particulates to form the multiple membrane layers. In some embodiments, the proximately located membrane layers are made using the same polymers and different particulates to form the multiple membrane layers. In some embodiments, the proximately located membranes layers are made using different polymers and different particulates to form the multiple membrane layers. In some embodiments, different membranes are chosen wherein there is no inherent chemical or mechanical bonding between the membrane layers, thereby requiring no addition of particulates to the outer surface of the innermost membrane.

In some embodiments, membrane components, for example polysaccharides or proteins, are chemically modified with methods and compositions well known in the art. Modifications are important for altering functional groups of the membrane components which, in turn, can alter polymerization characteristics, chemical characteristics, physicochemical characteristics, bonding propensities, electrostatics, hydrophobicity or hydrophilicity changes, diffusion propensity and resistance to diffusion, elasticity, stability, etc., in the final polymerized membrane. Modifications include, but are not limited to, carbamoylation, graft polymerization, etherification, esterification, reduction, oxidation, amination (e.g., (poly) lysine, arginine) halogenation, polymerization and degradation, complex formation with metals and salts, etc. See, for example, *Chemical and Functional Properties of Food Saccharides* (ISBN 978-0-8493-1486-5).

In some embodiments, various ions are employed for use in the polymerized membrane and related chemical processes. In, for example, the alginate polysaccharide membrane, ions are used to form cross-linkages between and among individual polymer strands. Various ion/counter ion salt complexes are contemplated for use herein, including, but not limited to, divalent cations such as calcium, potassium, magnesium, manganese, iron, zinc; trivalent cations including, but not limited to, manganese and iron; and salts thereof including, but not limited to, calcium lactate and calcium chloride.

In some embodiments, it is contemplated herein that micelles are formed within membranes and between membrane layers and/or between the inner membrane and the soft food. Micelles can alter the taste experience or mouth feel for the final encased product. Additionally, micelles engineered into the final membrane coated product may contain other ingestibles including sweeteners, flavors (fruits, herbs and spices, etc.), herbal extracts, energy supplements, dietary supplements, pharmaceuticals, over the counter drugs, sleep aids, appetite suppressants, weight gain agents, antioxidants, nutraceuticals, confections, etc., and combinations thereof.

Thickeners

Thickeners as used herein refers to substances used to produce viscous solutions or dispersions, to impart body, improve consistency, and/or stabilize emulsions, including suspending and bodying agents, setting agents, jellying agents, and bulking agents, etc., in the soft foods. Thickeners can be synthetically manufactured or derived from natural sources. Natural thickeners (or thickening agents) commonly are derived or produced from starches, vegetable gums, pectin, peptide polymers, and proteins. Various thickeners contemplated for use herein include, but are not limited to, acids, acidifiers, antibleaching agents, antibrowning agents, anticaking agents, antimicrobial agents, antioxidants, antioxidant synergists, antisticking agents, binders, bleaching agents, bodying agents, buffers, bulking agents, carbonating agents, carrier solvents, clarifying agents, cloud producing agents, colloidal stabilizers, color fixatives, color stabilizers, coloring agents, defoaming agents, disintegrating agents, dispersing agents, dough conditioners, drying agents, emulsifiers, enzyme activators, extraction solvents, fillers, film formers, filter aids, firming agents, flavor enhancers, flavoring adjuncts, flavoring agents, flour-treatment agents, foaming agents, free-flow agents, freezants, glazes, gelling agents, general purpose additives, humectants, intensifiers, leavening agents, lubricants, maturing agents, moisture-retaining agents, neutralizing agents, oxidizing agents, packing gases, pH control agents, plasticizers, polishes, preservatives, propellants, sequestrants, solubilizers, stabilizers, starch-modifying agents, surface-active agents, surface-finishing agents, suspending agents, sweetening agents, synergists, texture-modifying agents, texturizers, thickeners, wetting agents, whipping agents, and derivatives and combinations thereof.

In certain embodiments, thickeners contemplated for use herein for soft food payloads include, but are not limited to, 1,3-butylene glycol, acacia, acetic and fatty acid esters of glycerol, acetone, acetone peroxides, acetylated distarch adipate, acetylated distarch phosphate, acetylated monoglycerides, acid-treated starch, adipic acid, agar, alginic acid, alkaline-treated starch, aluminum ammonium sulfate, aluminum potassium sulfate, aluminum silicate, aluminum sodium sulfate, aluminum sulfate, aluminum ammonium sulfate, ammonium adipate, ammonium alginate, ammonium bicarbonate, ammonium carbonate, ammonium chloride, ammonium dihydrogen phosphate, ammonium hydrogen carbonate, ammonium phosphate, ammonium phosphatides, ammonium salts of phosphatidic acid, ammonium sulfate, anoxomer, ascorbic acid, ascorbyl palmitate, ascorbyl stearate, azodicarbonamide, beeswax, benzoic acid, benzoyl peroxide, beta-cyclodextrin, bleached starch, bone phosphate, brominated vegetable oil, butyl p-hydroxybenzoate, butylated hydroxyanisole, butylated hydroxymethylphenol, butylated hydroxytoluene, calcium acetate, calcium alginate, calcium aluminum silicate, calcium ascorbate, calcium benzoate, calcium bromate, calcium carbonates, calcium chloride, calcium citrate, calcium dihydrogen phosphate, calcium disodium ethylenediamine-tetraacetate, calcium DL-malate, calcium ferrocyanide, calcium gluconate, calcium hydrogen sulfite, calcium hydroxide, calcium iodate, calcium lactate, calcium lactobionate, calcium peroxide, calcium phosphate, calcium polyphosphates, calcium propionate, calcium pyrophosphatecalcium salts of fatty acids, calcium silicate, calcium sorbate, calcium stearate, calcium stearoyl lactylate, calcium sulfate, calcium tartrate, calciumiodiate, candelilla wax, carbamide, carbon dioxide, carnauba wax, carob bean gum, carrageenan, castor oil, cellulose gum, celluloses, chlorine, chlorine dioxide, cholic acid, choline salts and esters, citric acid, citric and fatty acid esters of glycerol, crosslinked sodium carboxymethylcellulose, cupric sulfate, D-alpha-tocopherol, dammar gum, decanoic acid, dedesoxycholic acid, dedextrins, dextrin ethyl cellulose, dehydroacetic acid, dextrose, diacetyltartaric acid esters of mono- and diglycerides of fatty acids, diammonium hydrogen phosphate, dicalcium pyrophosphate, diethyl pyrocarbonate, dilauryl thiodipropionate, dimethyl dicaronate, dimethylpolysiloxane, dioctyl sodium sulfosuccinate, dipotassium hydrogen phosphate, disodium ethylenediamine-tetraacetate, disodium hydrogen phosphate, disodium pyrophosphate, distarch phosphate, DL-alpha-tocopherol, DL-tartaric acid, dodecyl gallate, erythorbic acid, ethoxyquin, ethyl alcohol, ethyl cellulose, ethyl hydroxyethyl cellulose, ethyl p-hydroxybenzoate, ethyl protocatechuate, ethylene dichloride, esters of glycerol and thermally oxidized soy bean fatty acids, ethoxylated mono- and diglycerides, ethyl hydroxyethyl cellulose, ferric ammonium citrate, ferrous ammonium citrate, formic acid, gellan gum, gelatin, genipin, gibberellic acid, glucono delta-lactone, glycerin, glycerol, glycerol ester of wood rosin, guaiac resin, guar gum, gum acacia, gum arabic, gum ghatti, gum guaiac, heptylparaben, peroxide derivatives, hydrogen peroxide, hydroxylated lecithin, hydroxypropyl cellulose, hydroxypropyl distarch phosphate, hydroxypropylmethyl cellulose, hydroxypropyl starch, insoluble polyvinylpyrrolidone, iron gluconate, iron lactate, isoamyl gallate, isopropyl alcohol, isopropyl citrate mixture, kaolin, karaya gum, L(+)-tartaric acid, lactated monodiglycerides, lactic and fatty acid esters of glycerol, lactitol, lactylated fatty acid esters of glycerol and propylene glycol, lactylic esters of fatty acids, lauric acid, lecithin, locust bean gum, magnesium carbonate, magnesium DL-lactate, magnesium gluconate, magnesium hydrogen carbonate, magnesium hydroxide, magnesium hydroxide carbonate, magnesium L-lactate, magnesium oxide, magnesium salts of fatty acids, magnesium silicate, magnesium stearate, maltitol, mannitol, methyl alcohol, methyl ethyl cellulose, methylcellulose, methylene chloride, metatartaric acid, methylparaben, microcrystalline cellulose, milk protein, mineral oil, modified cellulose, modified starches, monoglyceride citrate, mono- and diglycerides, monostarch phosphate, myristic acid, nisin, nitrogen, nitrous oxide, nordihydroguaiaretic acid, o-phenylphenol, octanoic acid, octyl gallate, oleic acid, oxidized starch, oxystearin, palmitic acid, paraffin wax, pectin, pentapotassium triphosphate, pentasodium triphosphate, petrolatum, petroleum jelly, petroleum wax, phosphated distarch phosphate, phosphoric acid, pimaricin, poloxamer 331, poloxamer 407, polydimethylsiloxane, polydextroses, polyethylene glycols, polyglycerol esters of fatty acids, polyoxyethylenes, polypropylene glycol, polysorbates, polyvinylpolypyrrolidone, polyvinylpyrrolidone, potassium acetate, potassium acid tartrate, potassium adipate, potassium alginate, potassium benzoate, potassium bicarbonate, potassium carbonate, potassium chloride, potassium citrate, potassium dihydrogen citrate, potassium dihydrogen phosphate, potassium ferrocyanide, potassium gibberellate, potassium gluconate, potassium hydroxide, potassium iodate, potassium lactate, potassium metabisulfite, potassium nitrate, potassium nitrite, potassium persulfate, potassium phosphate, potassium polymetaphosphate, potassium polyphosphates, potassium L(+)-tartrate, potassium salts of fatty acids, potassium sorbate, potassium sulfate, potassium sulfite, potassium tripolyphosphate, processed eucheuma seaweed, propane-1,2-diol alginate, propionic acid, propyl gallate, propyl p-hydoxybenzoate, propylene glycol, propylene glycol alginate, propylene glycol esters of fatty acids, propylene glycol mono- and diesters, propylene oxide, propylparaben, quillaia extracts, rice bran wax, salts of fatty acids, shellac, silicon dioxide, sodium acetate, sodium acid, sodium acid pyrophosphate, sodium adipate, sodium alginate, sodium aluminosilicate, sodium aluminum phosphate, sodium ascorbate, sodium benzoate, sodium bicarbonate, sodium bisulfite, sodium carbonate, sodium carboxymethylcellulose, sodium caseinate, sodium chloride, sodium citrate, sodium dehydroacetate, sodium diacetate, sodium dihydrogen citrate, sodium dihydrogen phosphate, sodium dioxide, sodium DL-malate, sodium erythorbate, sodium ferrocyanide, sodium fumarate, sodium gluconate, sodium hydrogen carbonate, sodium hydrogem DL-malate, sodium hydrogen sulfite, sodium hydroxide, sodium hypophosphite, sodium L(+)-tartrate, sodium lactate, sodium lauryl sulfate, sodium metabisulfite, sodium metaphosphate, sodium nitrate, sodium nitrite, sodium phosphates, sodium polyacrylate, sodium polyphosphates, sodium potassium tartrate, sodium propionate, sodium pyrophosphate, sodium salts of fatty acids, sodium sesquicarbonate, sodium stearoyl lactylate, sodium stearyl fumarate, sodium sulfite, sodium tartrate, sodium thiosulfate, sodium tripolyphosphate, sorbic acid, sorbitan monolaurate, sorbitan monooleate, sorbitan monopalmitate, sorbitan monostearate, sorbitan tristearate, sorbitol, sorbitol sodium, sulfur dioxide, stannous chloride, starches, starch acetate, starch sodium octenylsuccinate, stearic acid, stearyl citrate, stearyl monoglyceridyl citrate, stearyl tartrate, succinic acid, succinylated monoglycerides, sucroglycerides, sucroses, sucrose acetate isobutyrate, sucrose esters of fatty acids, talc, tannic acid, tannins, tara gum, tartaric acid, tert-butylhydroquinone, tetrapotassium pyrophosphate, tetrasodium pyrophosphate, thiodipropionic acid, tocopherols, tragacanth, tragacanth gum, triacetin, triammonium citrate, tricalcium phosphate, trichloroethylene, triethyl citrate, trimagnesium phosphate, tripolyphosphate, tripotassium citrate, tripotassium phosphate, trisodium citrate, trisodium phosphate, urea, waxes, xanthan gum, xylitol, and derivatives and combinations thereof.

Soft Food Compositions

Soft foods can be any solid food product that has been processed into a semi-solid to liquid state and treated with a thickening agent to achieve a desirable consistency, for example by reconstitution of an extract or processed food, or using a pureed food. Additionally, liquids, liquid food extracts, and/or naturally soft foods (e.g., ripe bananas) can be used in that natural state or further processed to achieve a desired firmness or viscosity. Soft foods can be, or can be processed from, for example, fruits, vegetables, meats, one or more dairy products, carbohydrate food products, botanicals, confections, fortified substances, and/or combinations of the above.

Fruits provide an excellent food source that can be used in its natural state, or further processed and refined with thickeners to achieve a more desirable viscosity. Fruits contemplated for the soft foods described herein include, but are not limited to, any of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof.

Uses of Soft Food Compositions

Soft food compositions as described herein can be used for various consumer markets. For example, children, babies and toddlers may have a difficult time biting and/or swallowing solid foods. The soft foods described herein allow for eating any of a variety of soft foods in an easily edible and conveniently packaged portion. The encapsulated soft foods can be manufactured to specific sizes for portion control and to mitigate any potential hazards (e.g., choking). Adults with certain disabilities or conditions may also find the soft foods described herein to be convenient for providing alternative solutions to eating solid foods. For example, hospital procedures may make it difficult for patients to chew and swallow hard or solid foods. Additionally, adults fitted with dentures may find the soft food products described herein to be a satisfying alternative to eating solid foods.

Example 1

Encapsulated Soft Foods

Membrane layer and inner compositions to be used in the functional nutrition transport systems can include various ingredients to achieve different products (e.g., different flavors, textures and ingredients. Examples of membrane layer compositions and soft food compositions to be enclosed by the membrane are provided below. Thickeners are optionally used, and can increase the overall viscosity of the soft food to the desired hardness.

TABLE 1

Strawberry puree stock

| Ingredient | Amount* |
| --- | --- |
| Strawberry puree (Boiron) | 300 g |
| Calcium lactate | 6 g |

*basestock; individual serving size approximately 10 g of base stock

Mix together strawberry puree with calcium lactate. Freeze solution in desired mold or container.

TABLE 2

Strawberry caramel stock

| Ingredient | Amount* |
| --- | --- |
| Strawberry puree (Pacific Ridge Farms) | 201.7 g |
| Cane sugar (Domino) | 20 g |
| Water | 53.8 |
| Organic Tapioca flour (Let's Do Organic) | 20 g |
| Gellan gum (Kelcogel LT100) | 0.5 g |
| Strawberry Flavor #31684) | 4 g |

*base stock; individual serving size approximately 10 g of base stock

In an appropriate container, heat and mix tapioca flour, water and puree. After tapioca dissolves, add cane sugar. Once mixture is homogenous, add gelan gum and let mixture thicken. Remove from heat and transfer to mold. Let set to room temperature.

TABLE 3

Strawberry mousse stock

| Ingredient | Amount* |
| --- | --- |
| Strawberry puree (Boiron) | 130 g |
| Cane sugar (Domino) | 150 g |
| Water | 100 g |
| Gelatin, 225 bloom/40 mesh (FB Leiner) | 20 g |

*basestock; individual serving size approximately 10 g of base stock

Weigh out gelatin powder and hydrate in distilled water for 10 minutes. Mix puree and sugar in container and bring to boil. Once boil is achieved, remove container from heat and add gelatin slurry. Whisk together mixture for 10 minutes. Pour mixture into pan or mold and let rest at room temp for 2 hours.

| Strawberry soft fruit stock | |
| --- | --- |
| Ingredient | Amount* |
| Strawberry puree (Boiron) | 300 g |
| Locust Bean Gum (TIC) | 75 g |
| Xanthan gum (Danisco) | 120 g |
| Strawberry flavor (Comax) | 0.6 g |

*basestock; individual serving size approximately 10 g of base stock

Weigh and mix together locust bean gum and xanthan gum. Add gums to puree and blend together with immersion blender. Heat solution to 90-100 C. Pour solution into desired mold or container, and cool to room temperature.

In general, the encapsulated soft food product can be made as follows. In an appropriate container, combine 15 g sodium alginate and into 985 g of mineral water, then heat over a low heat until it simmers. Mix until alginate is completely dissolved and solution has a uniform consistency. Let set at 4 C for 2-3 hours. Add sugar, stabilizer, flavorings, and other membrane components to a final concentration desired for the specific individual food compositions, and mix to a uniform consistency (see, for example, PCT International Publication No. WO 2013/113027, which is incorporated herein by reference in its entirety). Prepare a 2% calcium bath by mixing 20 g of calcium lactate with 1 liter water. Dissolve completely. Add soft food composition stocks to a pastry bag, piping bag, or similar device, or use pre-formed molds of food composition stocks. Dip end of pastry bag into inner membrane alginate solution, and form small spheres of 1-2 inch diameter. Alternatively, preformed portions of soft food compositions can be placed into the alginate solution, with or without a first calcium bath dip. Remove spheres from membrane alginate solution and place into calcium bath for 10-15 minutes. Remove spheres and dry the surface with absorbing paper. Store at 4 C or −20 C.

Example 2

Encapsulated Soft Foods with Fruit-Like Outer and Inner Textures

Critical to the design and manufacture of a "fruit like" product with a soft core is the inclusion of an outer layer (skin or membrane) that adheres or binds to the soft food inner core. Several advantages of this design include optional ingestion, a protective and washable layer, and minimizing water loss of the inner soft core. As provided herein, this natural fruit like product can be designed such that the inner soft food core adheres to the outer polymerized matrix or skin, allowing a consumer either to eat the entire encapsulated product or to peel away the encapsulating matrix from the inner soft food core and consume the inner core only. A reference set of inner core soft food components was designed with the following: 300 g pear puree, 50 g sugar, 1.6 g alginate, 1.2 g xanthan, 0.4 g agar, and 0.75 g locust bean gum (LBG), the mixture heated, homogenized and allowed to cool-set. After cool-set, the products were then encapsulated in an alginate/chitosan polymer matrix.

Adherence of the outer polymerized encapsulating matrix to the inner soft food core was evaluated. In one set of experiments, the inner soft food core pH was adjusted by dipping the reference cores in a bath of 2 M citric acid for 60 seconds. In a separate set of experiments the inner soft food core pH was adjusted by dipping the reference cores in a bath of 2 M citric acid for 60 seconds and then rinsing in de-ionized water for 10 seconds. In a third set of experiments, both xanthan gum and locust bean gum were removed and replaced with either agar or alginate until similar textural visco-elastic properties to the reference cores was achieved. In a fourth set of experiments, cores were manufactured that had either xanthan or locust bean gum removed, but no additional agar or alginate was included. For these cores not having either locust bean gum or xanthan gum, the cores remained in a viscous liquefied state not demonstrating any visco-elastic properties.

For all soft food cores, polymer matrix encapsulation was completed by coating the core in a bath of 1% alginate+1.5% cane sugar+0.5 carotenoid resin, followed by coating with a chitosan solution of 5.2% lactic acid+0.5% calcium lactate+ 5.0% chitosan to form an outer polymerized matrix encapsulating the inner soft food core. The alginate/chitosan polymerization step was repeated 3 times, and samples were allowed to cure for at least 48 hours.

Control groups with the reference cores showed characteristically tight encapsulating polymer matrix-to-inner soft food core adherence. Encapsulated food products could be cut into quarters with the polymer matrix remaining adhered to core. With effort, the polymer matrix could be separated or peeled from the inner soft food core, but still adhered tightly to all points of contact with the inner core.

The pH of the reference soft food inner core without citric acid treatment was approximately 4.0. After adjustment with citric acid solution, the outermost periphery of the soft food core (with and without washing in de-ionized water) was approximately pH 2.2. For both groups in which the pH of the inner soft core was adjusted to 2.2 and followed with encapsulation, the outer encapsulating matrix failed to show any adherence properties to the inner soft food core. The pKa of alginate is generally regarded to be 3.3-3.6, as the dissociation constants for the monomers comprising alginate (mannuronic acid and guluronic acid) are 3.38 and 3.65 respectively. Therefore, the pKa of the polymer is taken to be between those two values and is a function of monomer composition of the stock alginate. (Draget K I et al, Alginates from Algae in *Polysaccharides and Polyamides in the Food Industry. Properties, Production, and Patents*. Ed. A Steinbuchel and S K Rhee. Wiley VCH 2005 p1-30). Without reference to or limitation by any specific mechanism of adherence, pH of the reference standard inner soft food cores that adheres to the outer polymerized matrix was retained at a pH well above the approximate pKa of alginate solutions to promote inner soft food core-to-encapsulation matrix adherence.

Samples made by removing both locust bean gum and xanthan gum but having an increased agar concentration to match the mechanical properties of reference cores also showed extremely poor matrix-to-core adherence. The core was clearly loose inside of the encapsulating matrix before samples were cut: the spheres could be freely rotated inside of the encapsulating matrix, which came completely off after cutting the samples in half. No traces of inner soft food core were found on the contacted surface of the encapsulation matrix. pH testing indicated that these samples had the same pH as control samples (4.0).

Experimental groups that were pH adjusted approximately 2.2 or had the locust bean gum removed showed either a lack of adherence interactions between the alginate/ chitosan polymer encapsulating matrix and the inner soft food core. The lack of adherence was evident in the final products before they were cut in half, as the inner soft food cores felt loose inside of their encapsulating matrix. When the products were cut in half, the encapsulating matrix easily separated from the soft inner core. Control samples made with locust bean gum, xanthan gum and either or both alginate and agar exhibited a strong adherence interaction to the encapsulating matrix, as the matrix remained bound to the core after cutting the final encapsulated product, squeezing the final product to attempt extrusion of the soft inner core, and even after partial removal of the polymer matrix. These experiments indicate that the adhesion interaction is present when products are manufactured with the inner soft food core at a pH above the pKa of alginate and with the synergistic combination of locust bean gum, xanthan gum, and agar and/or alginate.

Example 3

Encapsulated Soft Foods with Pharmaceutical Masking

Palatability is a critical challenge in developing oral formulations for drug delivery, which strongly influences adherence to therapeutic regimens. For example, current pediatric drug delivery vehicles are generally limited as platforms for various reasons including: widely different solubilities for liquid dosage forms, variable taste characteristics, and limited ability to predict taste based on molecular structure. A desirable encapsulated soft food composition therefore adequately masks potential unpleasant tastes of many drugs. In certain aspects, the soft food composition is envisioned to be substantially different than currently available dosage forms, with respect to taste, texture, and overall experience, designed to provide a "non-medicinal" experience for children. In this example, caffeine was used as the active pharmaceutical ingredient because of its extreme bitter taste and common industry usage as a test compound for compositions which mask the bitter taste of pharmaceutical compounds.

The delivery vehicle is the soft food composition as described herein (i.e. fruit puree with textural modification by the addition of hydrocolloids in the core and an alginate/chitosan system for the polymerized encapsulating matrix. Specific recipe formulations were developed for pear, cherry, strawberry and were within previously developed formulations (see example 1).

Food-like particles (FLPs) were developed in order to mask or hide the extremely bitter taste of caffeine. Many technologies have been explored in both the pharmaceutical and food industries to prevent the interaction of active pharmaceutical ingredients with taste buds, including flavor enhancers, polymer coatings, anesthetic agents, solubility limiting compounds, etc. The composition provided herein instead takes advantage of mechanisms of flavor release in the mouth, starting from the scale of the food product itself (i.e. macro-scale) and how different elements of the food products are processed and released through the mastication and ingestion. A variety of polymer encapsulation techniques and materials were investigated for their suitability to effectively carry the active pharmaceutical ingredient through the mouth to avoid release during mastication and oral residence time. Taste-masking of the active pharmaceutical ingredient is thus the result of a combination of both a soft fruit core with thickeners and the engineered FLPs. Minimal chewing was required and resulted in short residence time in mouth, low water activity due to compartmentalization away from aqueous environment of the soft fruit core, decreased bitterness from the caffeine active pharmaceutical agent, and solid food characteristics.

Two cellulose derivatives were used as encapsulation agents for caffeine powder to develop FLPs: ethylcellulose (EC) is a water-insoluble, organosoluble polymer that is used in many pharmaceutical and specialty applications, and 2) methylcellulose (MC) cellulose ethers are water-soluble polymers that are also used in pharmaceutical and food applications, commonly as food additives.

Water-insoluble microparticles were manufactured using ethylcellulose to encapsulate caffeine. Taste-masking was accomplished due to (1) association of caffeine in a polymer (ethylcellulose) that is not water-soluble and therefore not released by saliva in the oral cavity, and (2) the small size of particles (<1 millimeter) prevents particles from getting broken down by mastication. Caffeine-ethylcellulose based microparticles were created using emulsion-based solvent evaporation as known in the art and based on encapsulation of aspirin in ethylcellulose. If desired, the caffeine-ethylcellulose based microparticles could have been made by spray drying or fluidized bed coating. A dispersed phase (ethylcellulose+caffeine dissolved in ethanol) was added to continuous phase (vegetable oil) under agitation to create ethanol-in-oil emulsion. The addition of heat caused ethanol to evaporate, resulting in ethylcellulose microparticles encapsulating caffeine. Process variables include ratios of solids, liquids, processing time and temperature were optimized, for final compositions of microparticles ranging from 1%-18% ww (caffeine/total weight), and yield of total material recovered was approximately 60-80%. Caffeine concentrations in the microparticles were determined by dissolving a given mass of microparticles in ethanol, measuring the absorbance of this solution at several dilutions, and comparing to a standard curve absorbance on microplate reader at 280 nm. Standard curves were developed which were linear from 20 mg/L to 200 mg/L caffeine. Ethylcellulose and oil were shown not to interfere with readings at these wavelengths. Preliminary in vitro dissolution profiles showed that caffeine release from the microparticles had reached a maximum by 48 hours in 0.1 M HCl. These ethylcellulose based microparticles ranged in size from ~50-1000 micrometers, and provided a grainy texture to the soft core similar to natural fruits such as pears. Approximately 1.5 g of the ethylcellulose microparticles (equal to about 150 milligrams of caffeine) were used as small FLPs, and were comparable to small seeds or small rough fibers inside the soft-gelled puree core. The texture with the ethylcellulose FLPs in core was markedly different than core without the FLPs, having a natural, granular quality which potentially enhanced the uniqueness of product.

Methylcellulose was used to encapsulate caffeine to derive water soluble microparticles from polymer films. These films optionally contained concentrated flavor enhancers, masking agents, colors, and plasticizers so that the food-like particles resembled fruit skins or a small dried fruit piece. Taste-masking was accomplished due to (1) localized delivery of flavor enhancers and masking agents with caffeine, and (2) the relatively small size of particles (<3 mm) prevents particles from getting broken down by mastication.

Caffeine particles, flavoring agents, masking agents, color, and methylcellulose were mixed in solution, poured into wide, shallow dish, and dried overnight in an oven or food dehydrator at moderate temperatures (120-160 F) into pre-cast methylcellulose films. The food-like particles were then made from the pre-cast methylcellulose films to the desired size by homogenizing by manually (knife or coffee grinder) for particle size (0.5 mm 3 mm). This size range was chosen as it is theoretically small enough to avoid excessive mastication, but large enough to minimize surface area volume ratio to limit exposed areas of water-soluble polymer (and prevent excessive release of caffeine). Typical component concentrations on a dry basis of the food-like particles were approximately 25% methylcellulose, approximately 12.5% caffeine, approximately 5-10% masking agent (i.e. Kolliphor), approximately 5-10% color (i.e. spinach powder), and approximately 50% flavor/plasticizer (i.e. berry in propylene glycol). An additional optional processing step utilized a thin enteric coating of ethylcellulose sprayed onto the surface of homogenized methylcellulose food-like particles to reduce release of caffeine during mastication.

Approximately two grams of methylcellulose microparticles (equal to about 200 milligrams of caffeine) were produced as small food-like particles, comparable to large, more flexible seeds (i.e. strawberry seeds, sesame seeds) or dried fruit (raisin pieces, dates, etc.) and dispersed throughout a soft gel puree core. The texture with methylcellulose food like particles in the soft fruit core was not noticeably different from the core without these particles, as these methylcellulose-based food like particles were thought to have hydrated to some extent and were fairly flexible. However, the soft fruit core components separated with some chewing, and these larger food-like particles became intermittently noticeable. Additionally, the bitter flavor of caffeine was noticeable, but also was markedly decreased from non-encapsulated doses.

While certain combinations of matrix polymers and inner compositions have been provided and described as being used together, other combinations are possible. It will be understood that various modifications may be made without departing from the spirit and scope of the invention.

What is claimed is:

1. A food composition, comprising:
a visco-elastic inner core comprising a soft food, xanthan gum, and a galactomannan; and
a polymerized edible hydrocolloid matrix encapsulating the visco-elastic inner core, wherein an outer surface of the visco-elastic inner core substantially adheres to an inner surface of the polymerized edible hydrocolloid matrix encapsulating the visco-elastic inner core wherein a pH of the soft food is about or above pH 3.3 or the pH of the soft food is about or above a pKa of the un-polymerized edible matrix, and further wherein the hydrocolloid matrix comprises at least one of an alginate and a chitosan.

2. The food composition of claim 1, wherein the galactomannan is at least one of the group consisting of locust bean gum, guar gum, combinations thereof, and derivatives thereof.

3. The food composition of claim 1, further comprising agar in the inner core.

4. The food composition of claim 1, wherein the soft food comprises at least one of a gel, an emulsion, a foam, a semi-solid, and combinations thereof.

5. The food composition of claim 1, wherein the soft food comprises a reconstituted fruit or a fruit puree.

6. The food composition of claim 5, wherein the fruit or fruit puree is selected from the group consisting of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof.

7. The food composition of claim 1, wherein the soft food further comprises a food-like particle.

8. A method of preparing a food composition, comprising the steps of:
a) providing a soft food, xanthan gum, and a galactomannan, and at least one edible polymer;
b) combining the soft food with xanthan gum and a galactomannan to form a visco-elastic inner core;
c) encapsulating the visco-elastic inner core in an unpolymerized edible hydrocolloid matrix that comprises the at least one edible polymer, wherein an outer surface of the visco-elastic inner core substantially adheres to an inner surface of the edible matrix encapsulating the visco-elastic inner core wherein a pH of the soft food is about or above pH 3.3 or the pH of the soft food is about or above a pKa of the un-polymerized edible matrix, and further wherein the hydrocolloid matrix comprises at least one of an alginate and a chitosan.

9. The method of claim 8, further comprising the step of polymerizing the edible matrix that comprises the at least one edible polymer.

10. The method of claim 8, wherein the galactomannan is at least one of the group consisting of locust bean gum, guar gum, combinations thereof, and derivatives thereof.

11. The method of claim 8, further comprising agar in the inner core.

12. The method of claim 8, wherein the soft food comprises at least one of a gel, an emulsion, a foam, a semi-solid, and combinations thereof.

13. The method of claim 8, wherein the soft food comprises a reconstituted fruit or a fruit puree.

14. The method of claim 13, wherein the fruit or fruit puree is selected from the group consisting of acai, aceola, apple, apricots, avocado, banana, blackberry, blueberries, cantaloupe, camu camu berry, cherimoya, cherries, clementine, coconut, cranberry, cucumber, currents, dates, durian, fig, goji berries, gooseberry, grapefruit, grapes, jackfruit, jujube, kiwi, kumquat, lemon, lime, longan, loquat, lucuma, lychee, mamey sapote, mango, mangosteen, melon, mulberry, nectarine, orange, papaya, passion fruit, peach, pear, persimmon, pineapple, plum, pomegranate, pomelo, prickly pear, prunes, raspberries, sapote, strawberries, tangerine, tomato, watermelon, and combinations thereof.

* * * * *